(12) United States Patent
Wilkins

(10) Patent No.: US 6,560,366 B1
(45) Date of Patent: *May 6, 2003

(54) METHOD FOR ANALYZING THE CONTENT OF A VIDEO SIGNAL

(76) Inventor: Paul Gordon Wilkins, 51 Old School Lane, Milton, Cambridge CB4 6BS (GB)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 113 days.

(21) Appl. No.: 09/051,862
(22) PCT Filed: Dec. 12, 1996
(86) PCT No.: PCT/GB96/03063
§ 371 (c)(1),
(2), (4) Date: Apr. 20, 1998
(87) PCT Pub. No.: WO97/22949
PCT Pub. Date: Jun. 26, 1997

(30) Foreign Application Priority Data

Dec. 16, 1995 (GB) .............................. 9525788

(51) Int. Cl.[7] .................................................. G06K 9/36
(52) U.S. Cl. ..................... 382/236; 386/165; 386/176; 348/402; 348/415; 348/421
(58) Field of Search ................................ 382/165–166, 382/233–236, 235–237, 103, 172; 348/402, 407, 412–415, 420–421

(56) References Cited

U.S. PATENT DOCUMENTS

| 5,164,819 | A | * | 11/1992 | Music | 348/420 |
| 5,561,477 | A | * | 10/1996 | Polit | 348/700 |
| 5,734,744 | A | * | 3/1998 | Wittenstein et al. | 382/166 |
| 5,774,593 | A | * | 6/1998 | Zick et al. | 382/236 |

* cited by examiner

Primary Examiner—Matthew C. Bella
Assistant Examiner—Gregory Desire
(74) Attorney, Agent, or Firm—Levisohn, Lerner, Berger & Langsam

(57) ABSTRACT

A method for analysing differences in the content of successive frames of a digital video sequence to create a profile that predicts the likely perceptual significance of and allows separation and classification of different type of signal component.

28 Claims, 3 Drawing Sheets

Frame
1

Video Details

Title : Traffic
Size : 320 * 240 pixels
Colour Depth : 8 bit grey scale
Frame Rate : 15 frames per second

5

10

15

METHOD FOR ANALYZING THE CONTENT OF A VIDEO SIGNAL

This invention relates to a method of analysis which yields a description of a video signal (hereinafter referred to as a profile or statistical profile), which relates the signal content to its likely perceptual significance.

Proven applications of the profile analysis include noise filtration, data compression, motion detection, object tracking and video special effects.

As a background to the invention, it will be understood that digital video is a major growth area, both in home entertainment and in business. Digital video is at the heart of up and coming technologies such as video conferencing and video telephony.

The main problem with digital video is the amount of data needed to represent even a small number of frames. Hence, processes that compress this data or improve the performance of other data compression techniques will play a crucial role in its development and successful application. This invention proposes a method of analysis which yields content and significance information in the form of a statistical 'profile'. This information can be used directly by CODECs to regulate the selection of blocks, regions or other image components contained within a video signal, or the selection of appropriate coding techniques. Alternatively it can be used to control a filtration process which selectively removes noise from a video signal.

Within any digital video signal, there is a considerable amount of noise. This is likely to be true even in high quality broadcast systems but is a particular problem in low cost solutions such as those which might be used, for example, in a video telephone. Noise significantly degrades the compression performance and the quality of the output from most video compression CODECs.

The method of the invention is intended to complement rather than necessarily replace existing compression, filtration, image processing and analysis techniques.

According to the invention, there is provided a method of analysing a digital video signal to generate a statistical profile thereof, according to which corresponding pixels in consecutive frames and/or neighbouring pixels in the same frame are examined for relative brightness and/or relative colour and stored as a function of the amount of change and the number of and/or pattern of changed neighbouring pixels, thereby to produce a pixel map, and the mapped pixels are categorised into classes ranging from zero score for zero change to the highest score for the greatest change, enabling the classification, i.e. statistical profile, to be utilised during further processing of the digital video signal.

The method may be performed by means of dedicated hardware or by programmed computerised apparatus.

Further features of the invention will be apparent from the following description, making reference to the accompanying drawings, in which.

Figure 1:
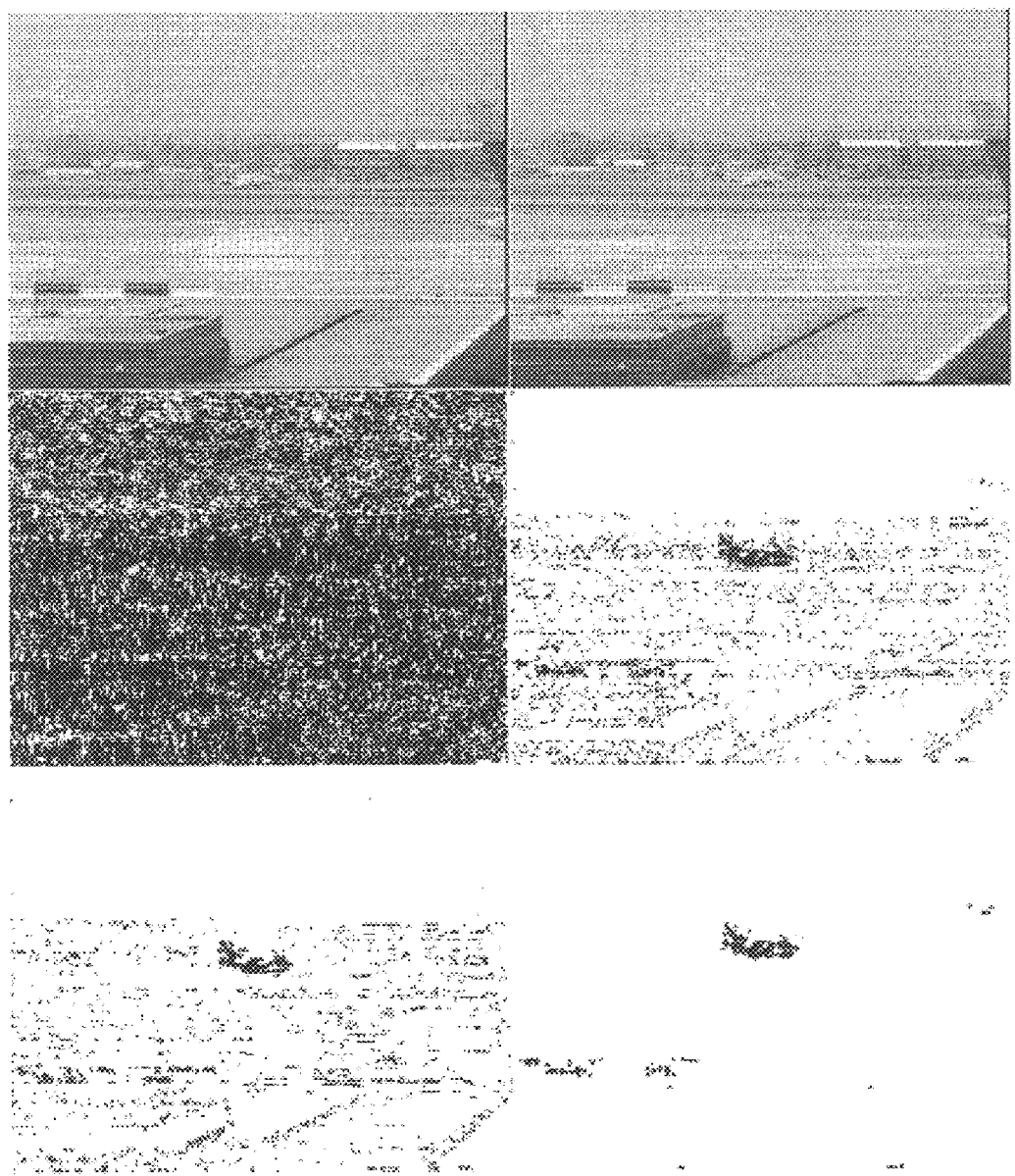
FIG. 1 illustrates application of the invention to noise filtration.

In more detail, FIG. 1 illustrates a noise filtration system based on a statistical profile and shows how it compares with other techniques. From left to right, top to bottom the images are:

2 consecutive frames from a video clip of an aircraft landing at an airport, a difference map for the two frames showing changed pixels in black, a threshold difference map showing pixels that have changed by more than +/−12 grey scales, a threshold difference map (as per the previous image) where the frames have first been pre-filtered using a median convolution, the results of applying a statistical profile based noise reduction scheme.

Figure 2:
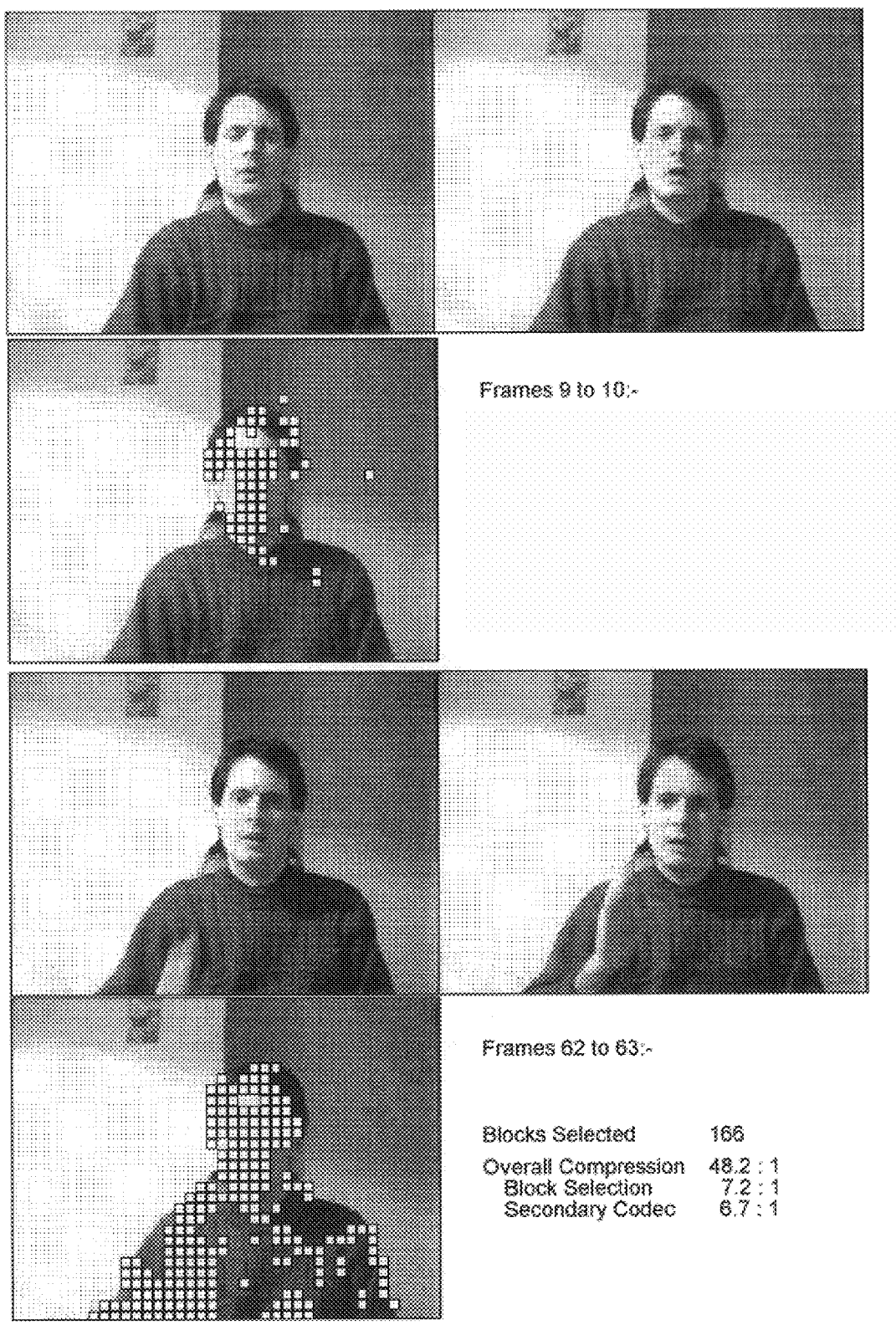
FIG. 2 illustrates application of the invention to video compression.

FIG. 2 shows output from a compression application that uses a statistical profile to filter the video and select blocks for compression with a secondary CODEC.

Figure 3:
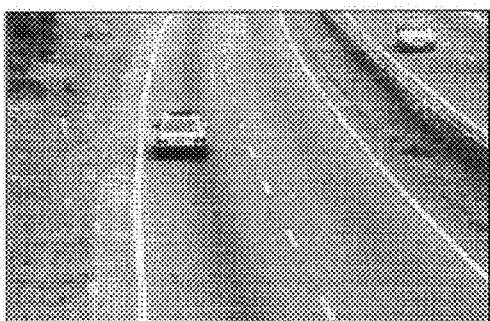
FIG. 3 illustrates application of the invention to video motion detection.
Figure 3:
Figure 3:
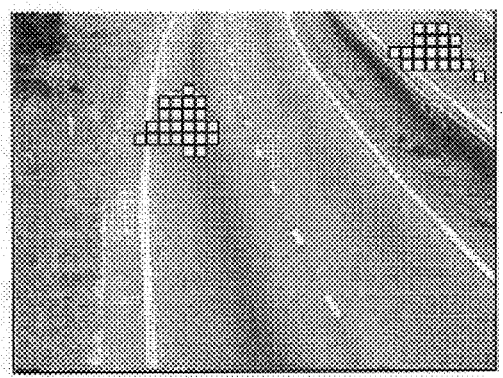
Figure 3:
Figure 3:
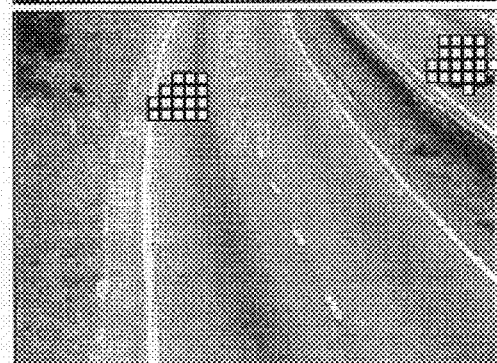
Figure 3:
Figure 3:
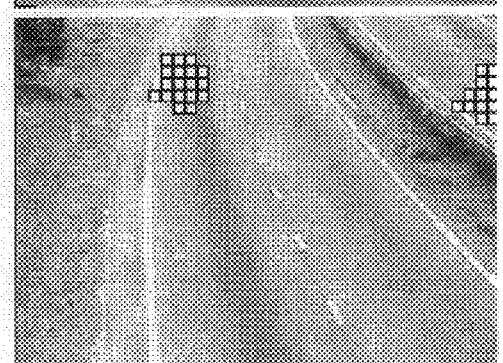

FIG. 3 illustrates the use of a statistical profile as part of a motion detection/object tracking system.

The profile is generated using a series of signal analyses, effectively stages. Each stage is designed to further enhance the separation of various signal components within the profile. The order of the stages does not necessarily need to be as described below, and one or more stages may be omitted.

In one initial stage (stage 1) a threshold filter examines the difference between corresponding pixels in consecutive frames (or neighbouring pixels in the same frame). If the brightness or colour differs by more than a threshold amount then the difference is recorded in a pixel difference map.

An alternative initial or further stage (stage 2) is designed to selectively suppress noise within the signal.

Within the difference domain, signal and noise components tend to have different characteristic signatures. In particular signal components tend to result in coherent and connected patterns of change. So, for example, a single pixel that changes in isolation from its neighbours is less likely to be part of the signal component and more likely to be part of the noise component.

A modified pixel map is created for changed pixels (or non-zero pixels in the threshold difference map created in stage 1 where the value (or score)) of each pixel is a function of the amount by which it has changed and the number of changed neighbours or pattern of changed neighbours.

For example a possible scoring system might be:

if (pixel value in difference map is non-zero) and (number of non-zero neighbours in difference map is>=3)) then Pixel score=(magnitude of change/16)+ (number non-zero neighbours in difference map −3)

In this example the score will have the following characteristics:

Zero if a pixel has not changed by more than a threshold amount.

Zero if at least 3 of the pixel's immediate neighbours have not changed by more than the threshold amount.

Larger for larger changes.

Larger if a larger number of the pixel's neighbours have changed by more than the threshold amount.

The output from this stage is a pixel map in which the score of any pixel is likely to be higher if it forms part of the signal and lower for pixels that have not changed except as a result of noise.

A third stage (stage 3) seeks to amplify the scores of those pixels that are likely to be important in the definition of object features and boundaries, in particular, changing boundaries/features or the boundaries/features of moving objects.

Where an object moves relative to the field of view (either because it is moving or the field of view is changing) this will result in characteristic patterns of change within the difference domain. Specifically, movement will tend to result in lines of changed pixels perpendicular to the direction of movement at positions corresponding to the boundaries of the object and high contrast features within it (both at the old positions and the new positions).

Each pixel that has changed by more than a threshold value (stage 1) and/or achieved a score in a specific range during stage 2, is examined to see if it forms part of a line of pixels (for example horizontal, vertical, diagonal or a curve) meeting the same criteria. The score given to each pixel is a function of the length of the line of which it forms a part.

The scores obtained will tend to be higher for pixels that are important to the accurate definition of object boundaries or features and lower for those that have changed only as a result of random noise or those that form part of an area of uniform change (for example when the light level in a scene changes).

Stages 1–3 provide excellent separation for many categories of signal component. However, subtle changes in colour or luminance may not be adequately separated from noise components. For example, a small change in the lighting conditions that results in a luminance shift that is less than the threshold used in stage 1 may be treated as noise.

Stage 4 seeks to separate such subtle changes from pure noise by taking advantage of the non-random nature of the change.

If a region, block or group of neighbouring pixels have changed only as a result of random noise then it is to he expected that the number of pixels showing an increase in luminance (or the prominence of a particular colour component) will be roughly equal to the number of pixels that have changed in the opposite direction. This contrasts with the situation where there is a systematic shift in colour or luminance. Even if the change is quite subtle (i.e. smaller than the magnitude of the noise) the balance of change will shift one way or the other.

For example, if, in a block of pixels, 90% have increased in luminance, 5% are unchanged and 5% show decreased luminance, then it is unlikely that the change is the result of noise alone. The further the balance shifts in a particular direction, the stronger the indication that a non-noise signal component is present.

Examining the average change for a group of pixels can also be useful in some circumstances (this is a widely used technique). However, such averaging techniques can be unduly influenced by larger changes in just one or two pixels.

Stage 4 is therefore employed to further modify the pixel scores, or the scores of groups of pixels, in order to refine the profile (classification) of the video signal.

Thus, as stated, stages 1 to 3, possibly also including stage 4, provide a sound basis for the separation of various signal components. in many instances this will be adequate. However, a variety of additional techniques (stage 5) can be used to further refine the profile including:

Searching for specific patterns of linked pixels that have some higher level meaning.

Application of conventional noise suppression or feature enhancing filters to highlight or suppress specific signal components.

The patterns of change exhibited by a pixel or in a region of the picture over a longer period of time can be monitored and taken into account.

More detailed patterns of change among neighbouring pixels may be taken into account. (E.g. if a group of neighbouring pixels exhibits a similar change in luminance this has a different meaning from the situation where some neighbours have become darker whilst other have become brighter).

The absolute brightness/colour of a pixel or its relative brightness/colour compared to its neighbours may be taken into account.

These or other enhancements may be appropriate under specific circumstances where further refinement of the profile is sufficiently important to outweigh the cost of the additional processing required.

After combining the scores from at least some of stages 2 to 5 it is possible to categorise the pixels (stage 6). For example:

High significance transition (e.g. an edge pixel for a moving object).

High contrast transition (e.g. a hard shadow or the body of a moving object)

Medium significance transition (e.g. subtle light level or colour changes)

Low significance transition or noise transition

Unchanged background

The scores from groups of neighbouring pixels can be combined (stage 7) to give a composite score for a block or region. These regions can be categorised in much the same way as the individual pixels.

Aggregation of individual pixel scores into regions in this way has the advantage of suppressing the effect of individual rogue pixels and generally gives a more reliable categorisation of the image. However, if the regions are too large, there is a danger that significant but small structures may be incorrectly classified.

A similar profile may also be generated for a still image by comparing the original image with copies of itself offset by a small distance (e.g. one pixel) in various different directions (e.g. up, down, left, right and along the diagonals).

Once regions of the image (be they individual pixels or groups of pixels) have been classified according to their likely signal content or significance, this 'profile' can be used in a variety of ways. One example is noise filtration.

In this case, the profile is used to define regions (pixels or larger areas) that do not need to be updated because they have not changed or contain no significant 'non-noise' information. Excluding these regions from the data stream has the effect of eliminating much of the noise from the signal. The effectiveness of this technique is illustrated in FIG. 1 of the accompanying drawings.

An alternative and complementary approach to the exclusion based filtering described above, is to use the profile to identify regions (or pixels) that are likely to contain a high noise component and then selectively apply other noise suppression or filtration techniques to those regions (e.g. averaging kernels or median filters).

Another example is video compression. Profiling, as previously described, benefits video compression systems in a number of different ways. For example:

Elimination/filtration of noise from the video stream can greatly reduce the amount of data that needs to be compressed (see FIG. 2 of the accompanying drawings).

The profile can also be used to regulate the use of different compression algorithms to optimise the compression ratio/quality/processing requirement equation. (For example one might choose to use a less lossy or higher quality variant of an algorithm to compress blocks containing object boundaries.)

The profile can be used as a basis for dynamically assigning different frame rates/update frequencies to different areas of the image.

Still another example is motion vector analysis. The determination of motion vectors in digital video sequences is notoriously computationally intensive. A profile generated as previously described can greatly speed this process.

Firstly, it enables much of the image (for example those parts that contain only noise) to be excluded from the motion vector search.

Secondly, it provides a basis for prioritising the search. In particular, motion vectors are most likely to link areas or pixels with similar scores.

In another example, video motion/alarm event detection, objects can be defined by searching for groups of linked pixels or blocks with characteristic scores. The objects can then be further sub-classified acording to properties such as size, shape or speed of movement.

This section provides a simplistic illustration of how the profile can be applied to the detection of motion or alarm events within a digital video sequence.

Traditionally, 'in video' motion/event detection has been plagued by problems. In particular 'false alarms' caused by for example:

Birds flying across the field of view

Changes in lighting

Trees rustling in the wind

Noise or flicker in the image

However, a stistical profile produced as described above can provide an excellent starting point for discriminating between real events and false alarms such as those described above.

FIG. 3 of the accompanying drawings shows a series of frames taken from a clip of motorway traffic (frames 1, 5, 10 and 15). The white blocks correspond to areas where motion has been detected and must satisfy all the following rules.

1. They must have a composite score above a threshold value 'T'. This eliminates most of the noise and small fluctuations in the image.

2. At least 'n' immediate neighbours must also satisfy rule 1. This provides a mechanism for further suppressing the effects of random noise and for discriminating against very small objects.

3. If the area of a single block is 'A' then the total area of a group of connected blocks satisfying rules 1 and 2 must be in the range (Y×A) to (Z×A). This rule allows objects with particular area and size characteristics to be selected or excluded.

4. They must have satisfied rules 1 and 2 in the previous frame as well. This eliminates some transient effects.

The sample contains a number of possible causes of false alarms including significant noise/flicker (because the sample was digitised from a video tape rather than direct from a camera), moving vegetation, vibration (the shot was taken from a road bridge), and light level changes (e.g. between frames 10 and 15).

Finally, just as the profile can be used to selectively remove the noise component of a signal, it can also be used to selectively target or modify other signal components.

For example, in a time lapse video clip of the sun setting, the profile could be used to selectively filter out fast moving (relatively) foreground objects from the scene whilst allowing more subtle and gradual changes to pass through unaltered.

What is claimed is:

1. A method for analyzing a digital video signal, comprising the steps of:

examining corresponding pixels in consecutive frames and/or neighboring pixels in the same frame of said digital video signal to determine differences in brightness and/or color between said corresponding pixels in said consecutive frames and/or said neighboring pixels in the same frame of said digital video signal;

comparing said differences in brightness and/or color to a threshold value;

generating a pixel difference map by recording said differences in brightness and/or color for each pixel location for which said difference exceeds said threshold value;

statistically classifying said pixels by generating a score value for each pixel position within said pixel difference map, said score value being related to the value of said difference in brightness and/or color and the number and/or pattern of neighboring differences recorded in said pixel difference map;

recoding said generated score values into a modified pixel map; and using said modified pixel map to enable further processing of said digital video signal.

2. A method for analyzing a digital video signal according to claim 1, further comprising the step of examining corresponding pixels in consecutive frames and/or neighboring pixels in the same frame of said digital video signal with a threshold filter having a predetermined threshold value.

3. A method for analyzing a digital video signal according to claim 1, further comprising the steps of examining differences recorded in said pixel difference map for determining whether any of said recorded differences forms part of a connected set of said recorded differences, said connected set being formed by map locations where there are differences recorded, said locations being limited to vertically, horizontally or diagonally adjacent pixel positions; and generating said score value based on the length of said connected set.

4. A method for analyzing a digital video signal according to claim 3, wherein said connected set is a straight line.

5. A method for analyzing a digital video signal according to claim 3, wherein said connected set is a curved line.

6. A method for analyzing a digital video signal according to claim 1, further comprising the step of examining groups of neighboring pixels for change in relative brightness and/or relative color predominant in an overall region and modifying said modified pixel map accordingly.

7. A method for analyzing a digital video signal according to claim 6, wherein said groups of neighboring pixels are blocks of pixels.

8. A method for analyzing a digital video signal according to claim 6, further comprising the steps of counting the number of pixels changing in relative brightness and/or relative color by counting the number of pixels that increase in relative brightness and/or relative color; and comparing the number of pixels that have increased in relative brightness and/or relative color with the number of pixels that have decreased in relative brightness and/or relative color.

9. A method for analyzing a digital video signal according to claim 1, further comprising the step of examining said differences recorded in said pixel difference map for determining patterns formed by said differences and modifying said modified pixel map accordingly.

10. A method for analyzing a digital video signal according to claim 1, further comprising the step of monitoring the same corresponding pixels over at least three successive frames for detecting patterns of change and modifying said modified pixel map accordingly.

11. A method for analyzing a digital video signal according to claim 1, further comprising the step of passing said digital video signal through a feature-enhancing filter for highlighting or suppressing specific signal components prior to generating said pixel difference map.

12. A method for analyzing a digital video signal according to claim 11 wherein said feature-enhancing filter includes the feature of noise suppression.

13. A method for analyzing a digital video signal according to claim 1, wherein said step of generating a modified pixel map includes consideration of absolute brightness of the pixels.

14. A method for analyzing a digital video signal according to claim 1, wherein said step of generating a modified pixel map includes consideration of absolute color of the pixels.

15. A method for analyzing a digital video signal according to claim 1, further comprising the step of categorizing pixels using said modified pixel map into at least two of the following classes:
  1. high significance transition;
  2. high contrast transition;
  3. medium significance transition;
  4. low significance or noise transition; and
  5. unchanged background.

16. A method for analyzing a digital video signal according to claim 1, further comprising the steps of aggregating said score values for at least some of the pixels into pixel regions; and categorizing said pixel regions into at least two of the following classes
  1. high significance transition;
  2. high contrast transition;
  3. medium significance transition;
  4. low significance or noise transition; and
  5. unchanged background.

17. A method for analyzing a digital video signal according to claim 1, further comprising a step of filtering noise by statistically classifying said pixels.

18. A method for analyzing a digital video signal according to claim 1, further comprising a step of compressing said digital video signal by statistically classifying said pixels.

19. A method for analyzing a digital video signal according to claim 1, further comprising a step of performing a motion vector analysis on said digital video signal by statistically classifying said pixels.

20. A method for analyzing a digital video signal according to claim 1, further comprising a step of detecting video motion by statistically classifying said pixels.

21. A method for analyzing a digital video signal according to claim 1, further comprising a step of detecting an alarm event by statistically classifying said pixels.

22. A method for analyzing a digital video signal according to claim 1, further comprising a step of obtaining special video effects by statistically classifying said pixels.

23. A method for analyzing a digital video signal according to claim 1, further comprising a step of applying said statistical classification of said pixels to noise filtration.

24. A method for analyzing a digital video signal according to claim 1, further comprising a step of applying said statistical classification of said pixels to video compression.

25. A method for analyzing a digital video signal according to claim 1, further comprising a step of applying said statistical classification of said pixels to motion vector analysis.

26. A method for analyzing a digital video signal according to claim 1, further comprising a step of applying said statistical classification of said pixels to video motion.

27. A method for analyzing a digital video signal according to claim 1, further comprising a step of applying said statistical classification of said pixels to alarm event detection.

28. A method for analyzing a digital video signal according to claim 1, further comprising a step of applying said statistical classification of said pixels to obtaining special video effects.

* * * * *